(12) United States Patent
Lutzeyer et al.

(10) Patent No.: US 11,981,550 B2
(45) Date of Patent: May 14, 2024

(54) DEVICE FOR MONITORING FOR BEARING CAPACITY FAILURE AND SYSTEM

(71) Applicant: Putzmeister Engineering GmbH, Aichtal (DE)

(72) Inventors: Christian Lutzeyer, Stuttgart (DE); Martin Mayer, Reutlingen (DE); Marc Petrescu, Goeppingen (DE); Holger Schlechter, Obersulm (DE)

(73) Assignee: Putzmeister Engineering GmbH, Aichtal (DE)

( * ) Notice: Subject to any disclaimer, the term of this patent is extended or adjusted under 35 U.S.C. 154(b) by 888 days.

(21) Appl. No.: 16/982,113

(22) PCT Filed: Mar. 18, 2019

(86) PCT No.: PCT/EP2019/056689
§ 371 (c)(1),
(2) Date: Sep. 18, 2020

(87) PCT Pub. No.: WO2019/179932
PCT Pub. Date: Sep. 26, 2019

(65) Prior Publication Data
US 2021/0009388 A1    Jan. 14, 2021

(30) Foreign Application Priority Data
Mar. 20, 2018 (DE) ..................... 10 2018 204 281.0

(51) Int. Cl.
*B66C 23/88* (2006.01)
*B66C 23/80* (2006.01)

(52) U.S. Cl.
CPC .............. *B66C 23/88* (2013.01); *B66C 23/80* (2013.01)

(58) Field of Classification Search
CPC .......... B66C 23/88; B66C 23/80; B66C 23/00
(Continued)

(56) References Cited

U.S. PATENT DOCUMENTS 4,258,566 A * 3/1981 Decker ................. G01L 1/2225
  73/862.631
5,188,379 A * 2/1993 Krause ..................... B60S 9/12
  254/423
(Continued)

FOREIGN PATENT DOCUMENTS

DE         103 20 382 A1    12/2004
DE    20 2014 000 334 U1     4/2014
EP         2 727 876 A1      5/2014

OTHER PUBLICATIONS

International Search Report (PCT/ISA/210) issued in PCT Application No. PCT/EP2019/056689 dated May 29, 2019 with English translation (five (5) pages).
(Continued)

*Primary Examiner* — Hau V Phan
(74) *Attorney, Agent, or Firm* — Crowell & Moring LLP

(57) ABSTRACT

A device monitors for bearing capacity failure of a mobile work machine. The work machine has a number of stabilisers. Each stabiliser has a support foot having a support foot plate. When the mobile work machine is in a supported state, the support foot plate of at least one support foot is arranged on a base surface surrounding the work machine or on a base plate. The device for bearing capacity failure monitoring has a number of sensors for sensing a change in position of at least one support foot plate and/or at least one base plate. The device has an evaluation unit, which has a data connection to the number of sensors and is designed to detect a bearing capacity failure on the basis of a change in position of the at least one support foot plate and/or the at least one base plate that has been sensed by means of the number of sensors.

8 Claims, 3 Drawing Sheets

(58) Field of Classification Search
USPC ........................................... 280/763.1
See application file for complete search history.

(56) References Cited

U.S. PATENT DOCUMENTS

| | | | | |
|---|---|---|---|---|
| 6,351,696 | B1* | 2/2002 | Krasny | B66C 23/80 |
| | | | | 701/50 |
| 6,877,773 | B1* | 4/2005 | Bibb | B66C 23/80 |
| | | | | 180/324 |
| 7,208,896 | B2* | 4/2007 | Ford | B60S 9/04 |
| | | | | 318/432 |
| 9,550,475 | B1* | 1/2017 | Walker | B66C 23/78 |
| 10,040,194 | B1* | 8/2018 | Theobald | B65G 1/1375 |
| 10,752,479 | B2* | 8/2020 | Lotti | B66C 23/80 |
| 10,843,909 | B2* | 11/2020 | Lotti | B66C 23/88 |
| 2013/0277954 | A1* | 10/2013 | Goeggelmann | E04G 21/04 |
| | | | | 280/763.1 |
| 2014/0116975 | A1* | 5/2014 | Benton | B66C 23/88 |
| | | | | 212/302 |
| 2016/0039648 | A1* | 2/2016 | Magni | B66F 9/0655 |
| | | | | 414/687 |
| 2017/0217737 | A1 | 8/2017 | Rudy et al. | |
| 2018/0022325 | A1* | 1/2018 | Garceau | B60S 9/02 |
| | | | | 180/41 |

OTHER PUBLICATIONS

German-language Written Opinion (PCT/ISA/237) issued in PCT Application No. PCT/EP2019/056689 dated May 29, 2019 (six (6) pages).

* cited by examiner

DEVICE FOR MONITORING FOR BEARING CAPACITY FAILURE AND SYSTEM

FIELD OF APPLICATION AND PRIOR ART

The invention relates to a device for monitoring for bearing capacity failure for a mobile work machine and to a system having such a device.

The term bearing capacity failure is used in soil mechanics to refer, in particular, to lateral, breaking away of the ground as a result of an excessively large application of force. Bearing capacity failure is one of the most frequent causes for the tipping over of supported mobile work machines, for example of concrete pumps. Bearing capacity failure results in injuries and deaths on a regular basis.

OBJECT AND SOLUTION

The object of the present invention is to provide a device for monitoring for bearing capacity failure for a mobile work machine, and to provide a system, which work machine and system permit bearing capacity failure to be detected as early as possible.

The invention achieves the subject by providing a device for monitoring for bearing capacity failure for a mobile work machine and by providing a system, in accordance with the claimed invention.

The device for monitoring for bearing capacity failure is used in work machines, such as for example truck-mounted cranes or truck-mounted concrete pumps which have a number of stabilizers. The number of stabilizers can be, for example, between one and eight. The number of stabilizers is preferably four.

Each stabilizer can have one, in particular hydraulically operated, telescope.

A respective stabilizer has a support foot with a support foot plate.

In a supported state of the mobile work machine, the support foot plate of at least one support foot is supported on an underlying surface or piece of ground surrounding the work machine or is supported on a baseplate. The baseplate, if one is present, can be positioned on the underlying surface or piece of ground surrounding the work machine.

The supported state can be brought about after an installation process of the work machine has been concluded or ended. In particular, during the installation process the support foot is positioned on the underlying surface or on the baseplate by means of a controlled vertical and/or horizontal support foot movement. In the supported state, the work machine can be ready to operate or can be operated.

The device according to the invention for monitoring for bearing capacity failure of a mobile work machine has a number of sensors for sensing a change in position of at least one support foot plate and/or at least one baseplate, in particular in the supported state.

A respective sensor can be embodied with a reduced sensor functionality in such a way that it exclusively senses change in position of the support foot plate and/or of the baseplate, but does not sense other measurement variables such as for example the position. However, alternatively each sensor can also sense further measurement variables.

The change in position can be tilting, inclination or rotation about one or more rotational axes, since such changes in position are specific to the start of bearing capacity failure. However, a change in position according to the invention is not, in particular, merely sinking of the support foot plate and/or of the baseplate into the underlying surface without a tilting component, without an inclination component and/or without a rotational component, such as is caused, for example, by uniform settling of the underlying surface over the entire surface of the support foot plate and/or of the baseplate. Sinking alone is not specific to bearing capacity failure.

Furthermore, the device has an evaluation unit. The evaluation unit can advantageously be a computer, a smartphone, a tablet, a microprocessor-based control device and/or a control unit of the work machine.

The evaluation unit has a data connection to the sensors for transmitting the sensor data. The data connection can advantageously be cable-bound and/or without a cable, and can be, in particular, an UMTS, WLAN and/or Bluetooth data connection.

The evaluation unit is designed to detect bearing capacity failure on the basis of a change in position, sensed by means of the number of sensors, of the at least one support foot plate and/or of the at least one baseplate. In particular the evaluation unit can detect the bearing capacity failure if the sensed change in position exceeds a threshold value. The threshold value can be, for example, a tilting angle of the support foot plate and/or of the baseplate in the region of 1° to 5°. The threshold value is preferably 2° or 3°. A rate of change in position can also be evaluated in order to detect the bearing capacity failure.

The number of sensors can be, for example, equal to the number of support foot plates and/or baseplates. For this case, typically a plurality, for example four or eight, sensors and a single evaluation unit are provided, the evaluation unit having a data connection to all the sensors and evaluating the sensor signals of all the sensors. Alternatively, just a single sensor can be provided so that the sensor and evaluation unit form, for example, a retrofittable stand-alone device.

The device for monitoring for bearing capacity failure makes it possible to detect bearing capacity failure early in the supported state of the work machine. As a result of the early detection of the bearing capacity failure and its signaling it is possible to move people in the surroundings of the work machine into a safe place in good time.

In one development of the invention, each sensor of the number of sensors has a tilt sensor, an inclination sensor, a position sensor, an acceleration sensor, a pressure sensor, a travel sensor, a distance sensor and/or a 3D camera system.

In one development of the invention, the device has a signal encoder which is designed to output a warning signal, in particular an optical, acoustic and/or haptic warning signal, when bearing capacity failure is detected. The signal encoder can advantageously have a display, a loudspeaker and/or a vibration element.

In one development of the invention, the work machine and/or the device for monitoring for bearing capacity failure have/has an energy store which is designed to supply the device for monitoring for bearing capacity failure with energy. The energy store can be a fuel tank which is filled with fuel. In particular, by burning the fuel an engine can generate electrical energy for supplying the device. Alternatively, the energy store can be a battery, an accumulator, a compressed air accumulator or a hydraulic accumulator.

In one development of the invention, the signal encoder is designed to output a state-of-charge warning signal if the state-of-charge of the energy store drops below a limiting value. The state-of-charge warning signal can be an optical, acoustic and/or haptic warning signal. In particular, the state-of-charge warning signal can differ from the warning signal of detected bearing capacity failure. The limiting value can advantageously be selected such that with its state of charge the energy store can still supply the device with energy for, in particular, at least one, two or three hours.

Furthermore, the invention relates to a system. The system has a mobile work machine with a number of stabilizers and a device for monitoring for bearing capacity failure as described above. Each stabilizer has a support foot with a support foot plate. In a supported state of the mobile work machine, the support foot plate of at least one support foot is arranged on an underlying surface surrounding the work machine or is arranged on a baseplate. The baseplate, if one is present, is positioned on the underlying surface surrounding the work machine.

In one development of the invention, the device for monitoring for bearing capacity failure is designed to interrupt operation of the work machine when bearing capacity failure is detected. Interrupting the operation of the work machine increases the safety of the system when bearing capacity failure is detected.

BRIEF DESCRIPTION OF THE DRAWINGS

The invention is described below in detail with reference to the drawings, of which.

DETAILED DESCRIPTION OF THE EXEMPLARY EMBODIMENTS

Figure 1:
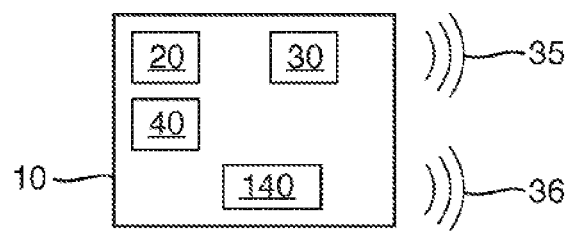
FIG. 1 shows a schematic block diagram of a device for monitoring for bearing capacity failure according to a first embodiment.
Figure 2:
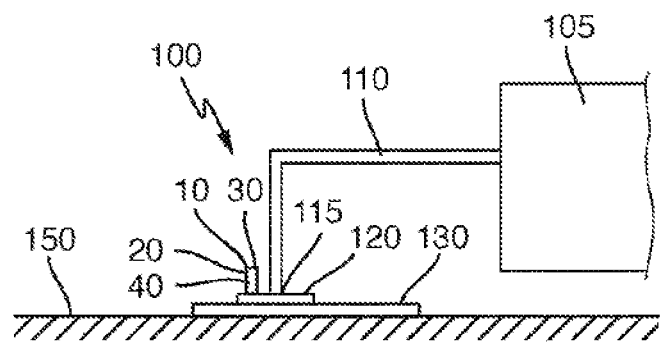
FIG. 2 shows a system having a work machine and the device for monitoring bearing capacity failure in FIG. 1, wherein the device for monitoring for bearing capacity failure is arranged on a support foot plate of the work machine.

FIG. 1 shows a schematic block diagram of a device 10 for monitoring for bearing capacity failure for a mobile work machine such as is illustrated, for example, by way of example in FIG. 2 with the reference number 105. The work machine 105 typically has at least one stabilizer 110, wherein the at least one stabilizer 110 has a support foot 115 with a support foot plate 120. In a supported state of the mobile work machine 105, the support foot plate 120 of the support foot 115 is arranged on an underlying surface 150 surrounding the work machine 105 or is arranged on a baseplate 130.

The device 10 for monitoring for bearing capacity failure has a sensor 20 for sensing a change in position of the support foot plate 120 and/or of the baseplate 130.

Furthermore, the device 10 has an evaluation unit 40 which has a data connection to the sensor 20 and which is designed to detect bearing capacity failure on the basis of a change in position, sensed with the sensor 20, of the support foot plate 120 and/or of the baseplate 130.

Furthermore, the device 10 has a signal encoder 30. The signal encoder 30 has a light source and a loudspeaker. As a result of the detection of bearing capacity failure by the evaluation unit 40, the signal encoder 30 outputs a warning signal 35 which has a flashing light signal and an acoustic signal.

As illustrated in FIG. 1, the device 10 for monitoring for bearing capacity failure also has an energy store 140 in the form of an exchangeable and/or chargeable accumulator which supplies the device 10 for monitoring for bearing capacity failure with energy.

If a state-of-charge of the energy store 140 drops below a limiting value, the signal encoder 30 outputs a state-of-charge warning signal 36. The limiting value is 10% of the maximum possible state-of-charge of the energy store 140. The state-of-charge warning signal 36 differs from the warning signal 35, for example in respect of the pitch and/or the volume of the acoustic signal and in respect of a wavelength and/or a flashing frequency of the flashing light signal.

FIG. 2 shows a system 100 with a work machine 105 and the device 10 for monitoring for bearing capacity failure in FIG. 1. The mobile work machine 105 is merely illustrated schematically in a side view in FIG. 2. The work machine 105 has a total of four stabilizers 110. For the sake of clarity, a single stabilizer 110 of the work machine 105 is illustrated. Each stabilizer 110 has a support foot 115 with a support foot plate 120.

FIG. 2 shows a supported state of the mobile work machine 105. In this supported state, each support foot plate 120 of the support foot 115 is arranged on an associated baseplate 130, wherein the baseplate 130 is arranged on an underlying surface 150 or piece of ground surrounding the work machine 105. In such a supported state, the work machine 105 is ready to operate or is operated.

The device 10 is in the form of a cartridge. The device 10 in the form of a cartridge can be arranged on the support foot plate 120 by positioning it or placing it, for example, on the support foot plate 120. A further device can be correspondingly arranged on each of the other support foot plates (not shown).

The sensor 20 can be an acceleration sensor for sensing a change in position of the support foot plate 120, wherein this change in position of the support foot plate 120 can be specific to impending bearing capacity failure. The sensor 20 is designed, in particular, to detect rotation about a longitudinal axis, transverse axis and/or vertical axis of the support foot plate 120 and tilting and/or inclination of the support foot plate 120. A change in position of the support foot plate 120 brings about a corresponding change in position of the sensor 20 so that the change in position of the support foot plate 120 can be sensed by means of the sensor 20. Alternatively or additionally, the sensor can also be a tilt sensor, an inclination sensor, a position sensor, a pressure sensor and/or a travel sensor.

If the sensor 20 senses a change in position of the support foot plate 120, for example in the form of a rotation and/or tilting of the support foot plate 120 about its transverse axis, this sensed change in position is transmitted to the evaluation unit 40 via the data connection. The evaluation unit 40 detects bearing capacity failure if the sensed change in position exceeds, for example, a limiting value of 0.4°/second.

If bearing capacity failure is detected, the device 10 interrupts operation of the work machine 105. For this purpose, the device 10 has an operative connection, in particular a data connection, to the work machine 105 via which the device 10 can interrupt the operation of the work machine 105. The interruption preferably takes place by the device 10 acting on a controller (not shown) of the work machine 105.

Figure 3:
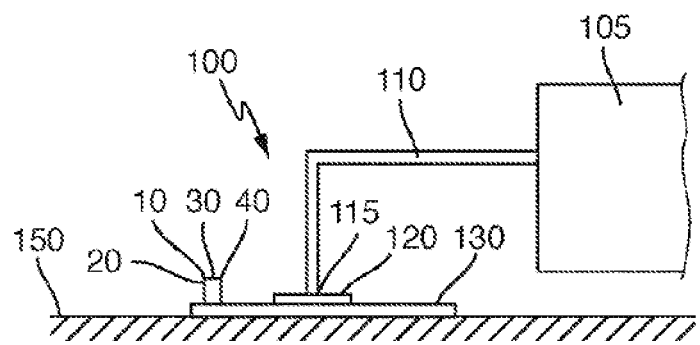
FIG. 3 shows a system having a work machine and the device for monitoring for bearing capacity failure in FIG. 1, wherein the device for monitoring the bearing capacity failure is arranged on a baseplate.

FIG. 3 shows an alternative arrangement of the device 10 for monitoring for bearing capacity failure. The device 10 in FIG. 3 is arranged on the baseplate 130 instead of on the support foot plate 120. The sensor 20 of the device 10 then senses a change in position of the baseplate 130, wherein the evaluation unit 40 is designed to detect bearing capacity failure on the basis of the sensed change in position of the baseplate 130.

Figure 4:
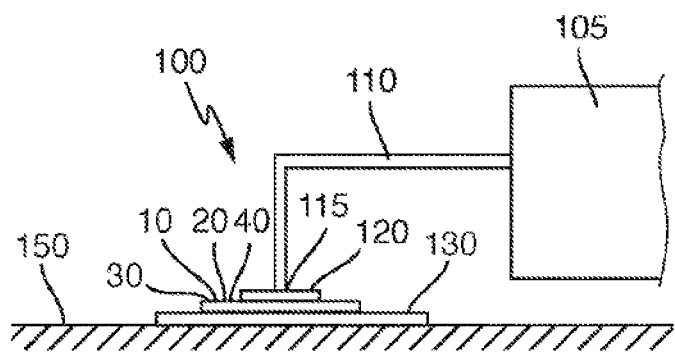
FIG. 4 shows a system having a work machine and the device for monitoring for bearing capacity failure in FIG. 1, wherein the device for monitoring for bearing capacity failure is arranged between a support foot plate of the work machine and a baseplate.

FIG. 4 shows an alternative arrangement of the device 10 for monitoring for bearing capacity failure. The device 10 for monitoring for bearing capacity failure is arranged here between the support foot plate 120 and the baseplate 130.

Figure 5:
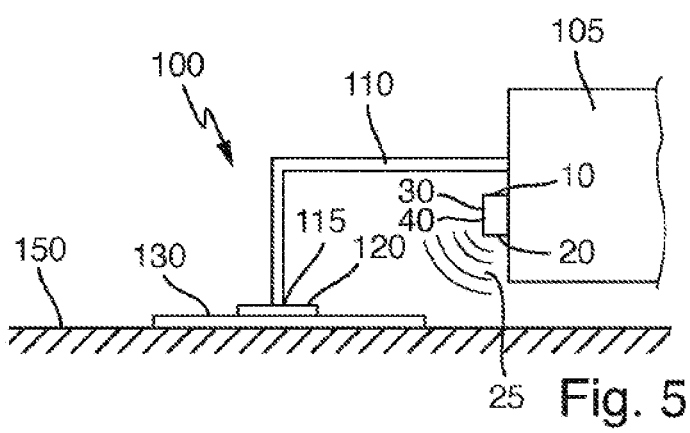
FIG. 5 shows a system having a work machine and the device for monitoring for bearing capacity failure in FIG. 1, wherein the device for monitoring for bearing capacity failure is arranged on the work machine and has a distance sensor.

FIG. 5 shows an alternative arrangement of the device 10 for monitoring for bearing capacity failure. The device 10 for monitoring for bearing capacity failure is arranged here on the work machine 105. The sensor 20 is embodied here as a distance sensor which measures the distance between the device 10 for monitoring for bearing capacity failure and the support foot plate 120 and/or the baseplate 130. The distance measurement is carried out by emitting and receiving a distance signal 25, in particular by measuring a transit time of the distance signal 25. The sensor 20 is designed to sense a change in position of the support foot plate 120 and/or of the baseplate 130 when two distances which are measured in chronological succession differ from one another.

Figure 6:
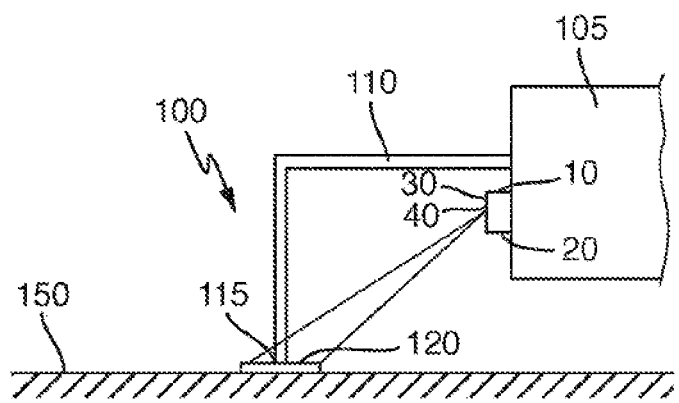
FIG. 6 shows a system having a work machine and the device for monitoring for bearing capacity failure in FIG. 1, wherein the device for monitoring for bearing capacity failure is arranged on the work machine and has a 3D camera system.

FIG. 6 shows the device 10 for monitoring for bearing capacity failure with the sensor 20, which is embodied here as a 3D camera system. The 3D camera system generates image data of the support foot plate 120. The 3D camera system can determine by pattern recognition the change in position of the support foot plate 120 or alternatively the change in position of a baseplate, if one is present, from the generated image data.

Figure 7:
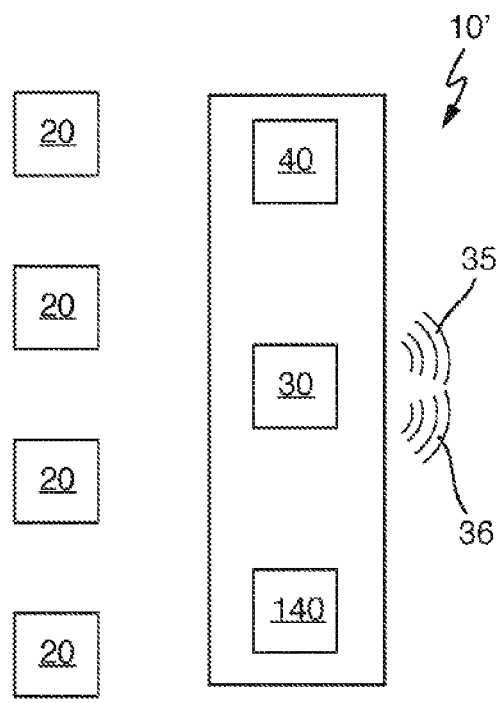
FIG. 7 shows a schematic block diagram of a device for monitoring for bearing capacity failure according to a further embodiment.

FIG. 7 shows a schematic block diagram of a device 10' for monitoring for bearing capacity failure according to a further embodiment. In contrast to the embodiment shown in FIG. 1, the device 10' shown in FIG. 7 has four sensors 20 which are each have a data connection to the evaluation unit 40. The four sensors 20 are each arranged in separate housings and can be arranged spatially separate from one another. This permits each sensor 20 to be arranged spatially separate from the evaluation unit 40. The evaluation unit 40, the signal encoder 30 and the energy store 140 are arranged in a separate housing.

Figure 8:
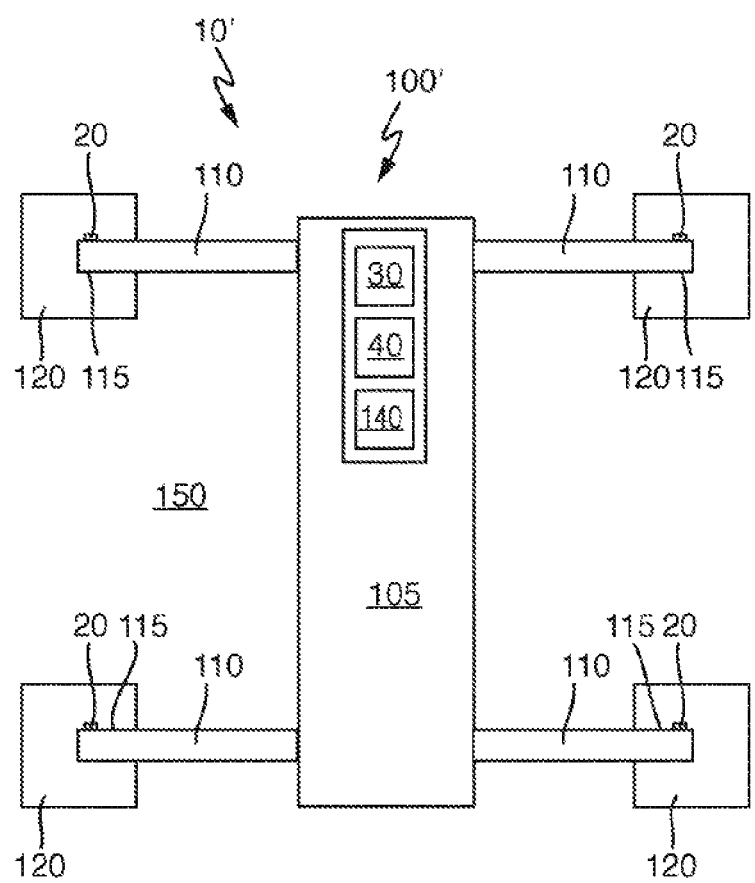
FIG. 8 shows a system having a work machine and the device for monitoring for bearing capacity failure in FIG. 7.

FIG. 8 shows an application of the device 10' shown in FIG. 7 for monitoring for bearing capacity failure, which device 10' is part of a system 100'. FIG. 8 illustrates the mobile work machine 105 schematically in a plan view. A sensor 20 for sensing the change in position of the associated support foot plate 120 is arranged on each of the four stabilizers 110 of the work machine 105.

As soon as at least one of the sensors 20 senses a change in position which exceeds a limiting value, the evaluation unit 40 detects bearing capacity failure.

The device 10, 10' according to the invention and the system 100, 100' according to the invention permit bearing capacity failure to be detected as early as possible.

What is claimed is:

1. A device for monitoring for bearing capacity failure for a mobile work machine,
    wherein the work machine has a number of stabilizers,
    wherein each stabilizer has a support foot with a support foot plate, wherein in a supported state of the mobile work machine, at least one support foot plate is arranged on an underlying surface surrounding the work machine or is arranged on a baseplate,
    wherein the device for monitoring for bearing capacity failure comprises:
    a number of sensors for sensing a change in position in the form of tilting, inclination or rotation about one or more axes of rotation of at least one support foot plate and/or at least one baseplate; and
    an evaluation unit which has a data connection to the number of sensors and which is configured to detect bearing capacity failure on the basis of a change in position, sensed by way of the number of sensors, of the at least one support foot plate and/or the at least one baseplate in a supported state.

2. The device for monitoring for bearing capacity failure according to claim 1, wherein
    each sensor of the number of sensors has a tilt sensor, an inclination sensor, a position sensor, an acceleration sensor, a pressure sensor, a travel sensor, a distance sensor and/or a 3D camera system.

3. The device for monitoring for bearing capacity failure according to claim 1, further comprising:
    a signal encoder which is configured to output a warning signal when bearing capacity failure is detected.

4. The device for monitoring for bearing capacity failure according to claim 3, wherein
    the warning signal is an optical, acoustic and/or haptic warning signal.

5. The device for monitoring for bearing capacity failure according to claim 3, wherein
    the signal encoder is configured to output a state-of-charge warning signal if a state-of-charge of the energy store drops below a limiting value.

6. The device for monitoring for bearing capacity failure according to claim 1, wherein
    the work machine and/or the device for monitoring for bearing capacity failure have/has an energy store, which supplies the device for monitoring for bearing capacity failure with energy.

7. A system, comprising:
    a mobile work machine with a number of stabilizers, wherein
        each stabilizer has a support foot with a support foot plate,
        in a supported state of the mobile work machine, the support foot plate of at least one support foot is arranged on an underlying surface surrounding the work machine or is arranged on a baseplate, and
        the baseplate is positioned on the underlying surface surrounding the work machine; and
    a device for monitoring for bearing capacity failure according to claim 1.

8. The system according to claim 7, wherein
the device for monitoring for bearing capacity failure is
   configured to interrupt operation of the work machine
   when bearing capacity failure is detected.

\* \* \* \* \*